US009434591B2

(12) United States Patent
Till et al.

(10) Patent No.: US 9,434,591 B2
(45) Date of Patent: Sep. 6, 2016

(54) METHOD FOR THE MONITORING, CONTROL AND OPTIMIZATION OF FILLING EQUIPMENT FOR FOODS AND BEVERAGES, SUCH AS, FOR BEVERAGE BOTTLES

(75) Inventors: Volker Till, Hofheim am Taunus (DE); Olaf Muszinski, Kelkheim (DE); Rolf Füssmann, Unna (DE); Thomas Stienen, Dortmund (DE); Ulrich Scholz, Lüdinghausen (DE); Herbert Menke, Burgbrohl (DE)

(73) Assignee: KHS GmbH, Dortmund (DE)

( * ) Notice: Subject to any disclaimer, the term of this patent is extended or adjusted under 35 U.S.C. 154(b) by 1143 days.

(21) Appl. No.: 12/567,371

(22) Filed: Sep. 25, 2009

(65) Prior Publication Data

US 2010/0082149 A1 Apr. 1, 2010

Related U.S. Application Data

(63) Continuation-in-part of application No. PCT/EP2008/001775, filed on Mar. 6, 2008.

(30) Foreign Application Priority Data

Mar. 28, 2007 (DE) ........................ 10 2007 014 802

(51) Int. Cl.

| | |
|---|---|
| ***G06F 7/00*** | (2006.01) |
| ***B67C 3/00*** | (2006.01) |
| ***B67B 3/26*** | (2006.01) |

(52) U.S. Cl.
CPC *B67C 3/007* (2013.01); *B67B 3/26* (2013.01)

(58) Field of Classification Search
USPC .................................................. 700/222, 214
See application file for complete search history.

(56) References Cited

U.S. PATENT DOCUMENTS

| | | | | |
|---|---|---|---|---|
| 5,414,777 A * | 5/1995 | van der Schaar | B07C 5/3412 209/526 |
| 5,427,161 A * | 6/1995 | Luhmann et al. | 141/144 |
| 5,429,161 A * | 7/1995 | Allard | 144/248.4 |

(Continued)

FOREIGN PATENT DOCUMENTS

| | | |
|---|---|---|
| CH | 695 940 A5 | 10/2006 |
| CN | 2438701 | 7/2001 |

(Continued)

OTHER PUBLICATIONS

International Search Report PCT/EP2008/001775.

(Continued)

*Primary Examiner* — Yolanda Cumbess
(74) *Attorney, Agent, or Firm* — Nils H. Ljungman & Associates

(57) ABSTRACT

A method of monitoring, controlling, and optimizing operation of a container filling plant, in which image data of different areas of the container filling plant is obtained using an electronic, image-detection arrangement. The image data is then analyzed by a computer to determine if a person, a machine, or a container is in an unwanted condition sufficient to cause at least one of: disruption in the operation of the plant, injury to a person, damage to a machine, or damage to a container. A signal is then generated for either automatic correction or manual correction of the unwanted condition based on the image data.

20 Claims, 5 Drawing Sheets

(56) References Cited

U.S. PATENT DOCUMENTS

| | | | | | |
|---|---|---|---|---|---|
| 5,831,859 | A * | 11/1998 | Medeiros et al. | 700/218 |
| 5,997,294 | A * | 12/1999 | Declercq | 432/224 |
| 6,275,603 | B1 * | 8/2001 | Cronshaw et al. | 382/142 |
| 6,446,632 | B1 | 9/2002 | Focke | |
| 6,474,368 | B2 * | 11/2002 | Clusserath et al. | 141/6 |
| 7,027,621 | B1 * | 4/2006 | Prokoski | 382/118 |
| 7,331,152 | B2 * | 2/2008 | Menke | 53/67 |
| 7,503,457 | B2 * | 3/2009 | Koren et al. | 209/559 |
| 7,857,161 | B2 * | 12/2010 | Pinney et al. | 221/10 |
| 8,074,807 | B2 * | 12/2011 | Koren et al. | 209/559 |
| 2003/0230590 | A1 * | 12/2003 | Gilmore | 221/2 |
| 2004/0260487 | A1 * | 12/2004 | Evans | 702/50 |
| 2006/0122729 | A1 * | 6/2006 | Murphy et al. | 700/222 |
| 2008/0258033 | A1 | 10/2008 | Ladra et al. | |
| 2009/0283517 | A1 * | 11/2009 | Mackay et al. | 219/700 |
| 2011/0052001 | A1 * | 3/2011 | Tan et al. | 382/103 |

FOREIGN PATENT DOCUMENTS

| | | | |
|---|---|---|---|
| DE | 41 14 798 | A1 | 11/1992 |
| DE | 42 07 835 | A1 | 9/1993 |
| DE | 42 39 238 | A1 | 5/1994 |
| DE | 43 43 750 | A1 | 9/1994 |
| DE | 43 32 645 | C2 | 3/1995 |
| DE | 297 13 701 | U1 | 2/1998 |
| DE | 100 33 652 | A1 | 1/2002 |
| DE | 202 03 287 | U1 | 6/2002 |
| DE | 201 20 700 | U1 | 4/2003 |
| DE | 102 45 720 | A1 | 4/2004 |
| DE | 198 56 067 | B4 | 4/2005 |
| DE | 10 2004 029 359 | A1 | 1/2006 |
| DE | 202005017180 | | 1/2006 |
| DE | 102004029356 | A1 | 2/2006 |
| DE | 10 2005 020 020 | A1 | 11/2006 |
| EP | 0 190 090 | A1 | 8/1986 |
| EP | 0 344 404 | A1 | 12/1989 |
| EP | 0 512 244 | A1 | 11/1992 |
| EP | 0 982 696 | A2 | 3/2000 |
| EP | 1 026 079 | A2 | 8/2000 |
| EP | 1 754 549 | A2 | 2/2007 |
| JP | 58026732 | A | 2/1983 |
| JP | 63242818 | A | 10/1988 |
| JP | 63306894 | A | 12/1988 |
| JP | 7280696 | A | 10/1995 |
| JP | 10-194202 | | 7/1998 |
| JP | 2000502474 | A | 2/2000 |
| JP | 2000 158527 | A | 6/2000 |
| JP | 2001171793 | A | 6/2001 |
| JP | 2006240659 | A | 9/2006 |

OTHER PUBLICATIONS

German Search Report 10 2007 014 802.1-23.

* cited by examiner

METHOD FOR THE MONITORING, CONTROL AND OPTIMIZATION OF FILLING EQUIPMENT FOR FOODS AND BEVERAGES, SUCH AS, FOR BEVERAGE BOTTLES

CONTINUING APPLICATION DATA

This application is a Continuation-In-Part application of International Patent Application No. PCT/EP2008/001775, filed on Mar. 6, 2008, which claims priority from Federal Republic of Germany Patent Application No. 10 2007 014 802.1, filed on Mar. 28, 2007. International Patent Application No. PCT/EP2008/001775 was pending as of the filing date of this application. The United States was an elected state in International Patent Application No. PCT/EP2008/001775.

BACKGROUND

1. Technical Field

The present application relates to a method for the monitoring, control and optimization of filling plants and equipment for products of types in which solid or liquid products are filled into containers such as cans, bottles or similar containers. The present application relates in one possible embodiment to filling plants and equipment for beverages.

2. Background Information

Background information is for informational purposes only and does not necessarily admit that subsequently mentioned information and publications are prior art.

Filling plants and equipment of this type for beverages are operated in a fully automated mode, for example starting from the feed of bottles, as appropriate to a station for bottle cleaning, a station for the inspection of the unfilled bottles, to the actual container filling machine, a device for closing or capping the bottles and finally to devices for the labeling and optionally for packing the bottles in appropriate transport units and for placing these transport units on pallets.

Because the contents of the bottles are frequently very sensitive to external factors such as harmful germs and bacteria, for example, for example in the food and beverage sector, the bottling plants are frequently operated in clean rooms, whereby attempts are made to prevent, restrict, and/or minimize the operating personnel, to the maximum extent possible, from intervening in the filling process.

On account of the complexity of the plant and machinery, including the transport units and the necessary or desired control system, attempts have been made to harmonize the elements of the plant to one another to achieve a smooth filling process with the optimum throughput, i.e. the highest possible output measured in terms of containers per hour.

On account of the mode of operation, it is necessary or desired to detect any errors or malfunctions inside the overall plant as early as possible. For example, disruptions of the smooth throughput of bottles must or should be detected as early as possible and must or should be resolved as rapidly as possible, to be able to utilize the maximum efficiency of the plant.

Object or Objects

An object of the present application is essentially to monitor a plant or machine. In the context of this plant or machine monitoring, for example, it becomes unnecessary or undesired to assign personnel who work inside the plant to monitor malfunctions and disruptions and/or to control the output of the plant, or at least to significantly reduce the number of personnel required or desired for these activities. Moreover, additional functions can also be realized to increase the safety of personnel and the reliability of the process.

SUMMARY

In at least one possible embodiment of the present application, the plant monitoring system and the error detection and correction system and/or the production control associated with it are operated automatically or at least essentially automatically.

With a method of the type described above, the present application teaches that this object is accomplished by the use of opto-electronic detection systems to obtain the necessary or desired control data and data processing equipment associated with these systems. In one possible embodiment, these opto-electronic detection systems are at least one electronic camera in connection with a downstream, computer-assisted image processing unit.

It is thereby possible, by means of the image processing unit, for example, to acquire current information on the operating status of at least a portion of the overall plant, whereby the contents of the image recorded by the camera are analyzed and used for the active influencing of the plant control system and/or for the execution of any measures that may be necessary or desired to protect personnel or to resolve problems.

In the context of the present application, the terms "analysis of the recorded image" and/or image processing mean that suitable software acquires information from the recorded images on the objects that are within the image. For this purpose, it is first determined in a known manner what objects are located in the image. These objects can be, for example, containers such as bottles or cans, whereby these containers can also be in different orientations in different locations, i.e. they can be standing upright on a conveyor and/or fallen over and lying on the ground.

Other objects can be people who are inside the bottling plant, for example. These people can also be in different locations and can be in the widest possible variety of bodily positions, or they can even be in motion. For the detection and recognition of objects, some image processing systems can be used which operate according to the process of scanning with a subsequent contour comparison, which can be followed by a recognition of defined characteristics, for example. The objective of this method is to determine relevant information about an object or by means of an object.

In an additional embodiment of the present application, the use of recognition systems of this type makes it possible to essentially guarantee or promote fully automated operation even in the event of a disruption or malfunction, i.e. an error detection can immediately or substantially immediately and automatically result in the execution of a control routine which can also include an automatic error resolution.

Some sub-control robots can be controlled by opto-electronic devices, whereby one simple and long-known possible application is the use of light barriers, from which at least one yes/no datum can be derived.

On the other hand, the opto-electronic system according to the present application is much more varied and complex. With the use of the present application, for example, the number of objects moved, e.g. the number of bottles to be filled or already filled, can also be called up, as can the three-dimensional position of bottles, such as a condition in which a bottle has fallen over and thus represents the risk of a malfunction or disruption of operation in other parts of the plant.

A technician skilled in the art will be familiar, for example, with controlling the output of the overall plant for the filling of containers or with regulating the output of individual machines in the overall plant on the basis of the occupation of the conveyors and/or buffer lines between the individual machines.

Some arrangements and methods indicate the location on the conveyors as well as on the buffer lines of a number of jam switches, which then emit a digital signal when they are actuated by a jam pressure that is present between the containers, i.e. when the conveyor line or the buffer line is occupied by bottles or cans. This method naturally supplies approximate information about the level of occupation of the conveyor line or the buffer line, such as in stages "empty," "twenty percent full" and "fifty percent full". More precise information on the level of occupation is currently not determined, because a larger number of jam switches means a significant increase in the costs of design and fabrication.

The present application teaches that the occupation of the transport or buffer lines is determined by one or more cameras, whereby the current level of occupation is determined by an electronic image processing of the images recorded. With the appropriate programming, it thereby becomes possible to determine for each individual buffer line, for example, precisely or generally graduated levels of occupation, such as in two or one percent intervals, for example, or even tenth of a percent intervals, for example.

For the determination of these finely graduated levels of occupation, within the image processing, the following sequence of operations can take place, for example: first the image recorded is analyzed to determine the number of bottles or cans on the buffer line at the moment the image was recorded, whereby in one possible embodiment each individual bottle is recognized as an object of the "bottle" type, i.e. as a bottle. Then the determined number of bottles is compared with a maximum possible number of bottles stored in the computer, from which the current level of occupation can be determined.

Depending on the determined level of occupation of the corresponding buffer line, the throughput of an individual machine can be in one possible embodiment regulated, which makes it possible to eliminate, restrict, and/or minimize complex and expensive wiring, among other things.

Additional configurations of the present application are described according to the present application. For example, in an additional possible configuration of the present application, thermal imaging cameras are used, whereby it becomes possible to measure temperatures, for example, in addition to the purely optical images. This method is in one possible embodiment well suited for monitoring individual processes within an overall plant. For example, the present application teaches that it is possible to control a pasteurizer which is frequently provided in plants for the bottling of foods and beverages so that the temperature of the containers that enter this pasteurizer and/or the temperature of the containers that exit the pasteurizer are within specified limits.

As a result of the use of a thermal imaging camera according to the present application, in combination with a downstream image processing and the use of the results (measured temperatures) to control the plant, the reliability and safety of the process can be further increased, without any increased effort or expense for wiring, for example.

The present application also teaches that it is possible, by means of the combination of a thermal imaging camera and a subsequent analytical image processing, to perform a protective monitoring of the entire bottling plant. It is likewise possible to monitor the equipment temperature of specified machines and/or storage tanks.

The systems can also be used to detect incorrectly positioned containers, for example, such as containers that have fallen over. The method according to the present application can also be used to monitor the flows of containers into the corresponding plant or the individual machines, such as from intermediate buffers, for example.

The systems according to the present application can also be used to realize a protection function for the persons or employees who work inside the plant. It thereby becomes possible, for example, to analyze the current location and/or the current bodily position and/or the movements made in comparison to images taken previously of any person inside the plant.

In one possible result of such an analysis, for example, it could be a question of determining whether a person was injured or is in an emergency situation. Indicators of an emergency situation could be, for example, a person "lying on the floor" in combination with an extended lack of movement by the person in question.

It could also be determined whether persons are in an area of the plant in which they are not permitted, such as in a sterile area, for example.

When such situations are detected, additional functions of the plant control system according to the present application can activate the corresponding measures, such as the triggering of an alarm, for example.

The apparatus according to the present application can also monitor the supply of materials directly on the processing machines, such as the labeling machines, for example, so that the appropriate measures can be initiated when the supply drops below a specified minimum level.

It is also possible to record the movements of the operating personnel of a bottling plant, which can yield information for the design of future plants.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is explained in greater detail below on the basis of at least one possible embodiment.

DESCRIPTION OF EMBODIMENT OR EMBODIMENTS

Figure 1:
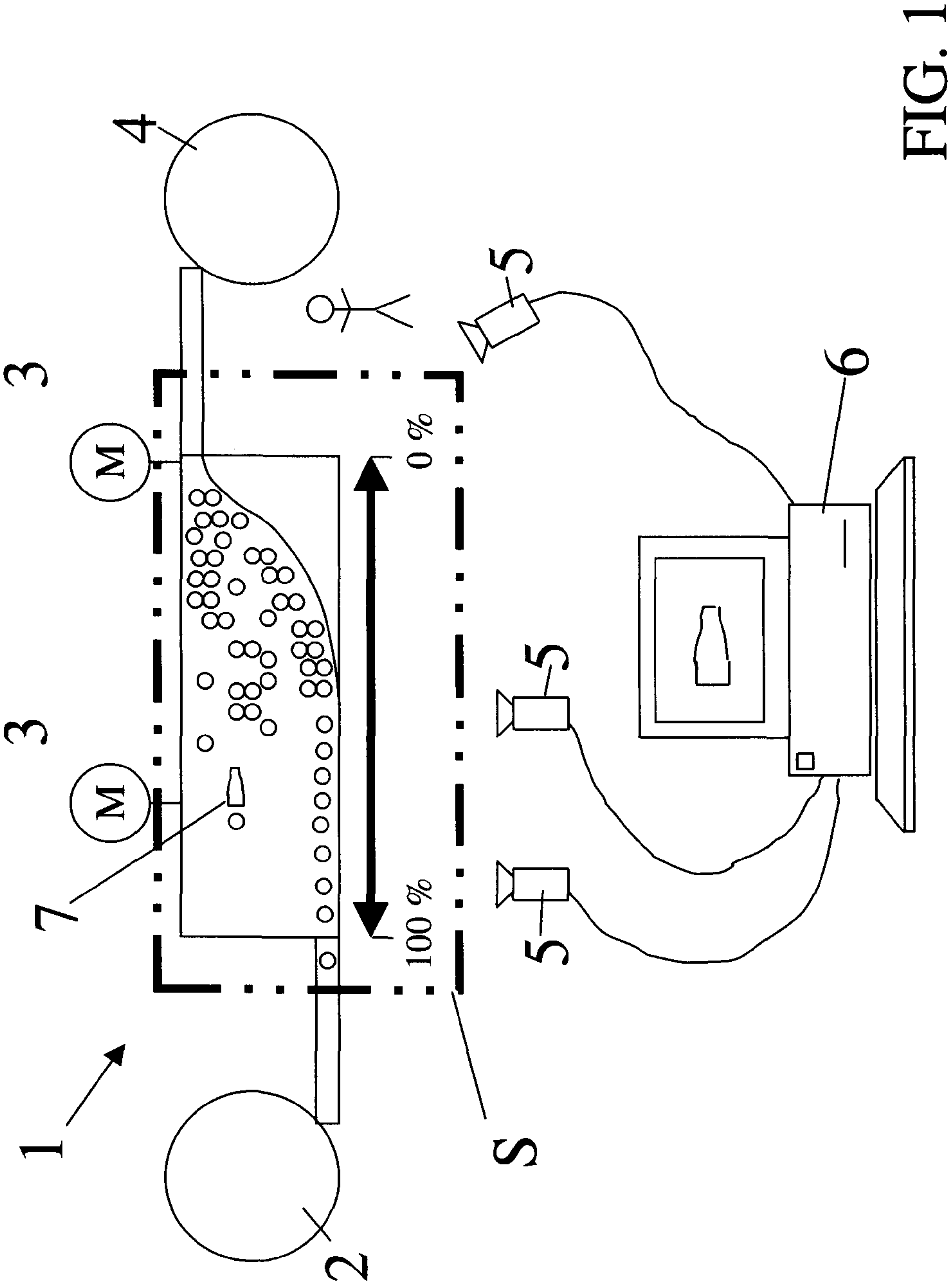
FIG. 1 is a schematic drawing which shows at least a portion of a plant for the filling of beverage bottles or similar containers.

A plant which is illustrated symbolically and is designated 1 in general, is designed to be used for the filling of beverage bottles, for example. The bottles are thereby fed from a first machine 2 via transport segments designated 3 to an additional machine 4. The transport segments 3 are driven by drive motors M.

For the monitoring of the plant, and also for example for the monitoring of the level of occupation of the transport segments and for the control of the plant, cameras which are designated 5 in general are provided, the data from which are fed to a data processing system 6, so that the plant can be controlled, and in one possible embodiment so that malfunctions and disruptions can be detected and resolved automatically. The scaling or the level of occupation of the transport line is indicated symbolically by a double arrow.

In the illustrated possible embodiment, the current position of a person inside the plant is also monitored. This person, for example, may not enter the safety zone designated by S. The safety zone can be identified, for example, by colored markings on the floor of the plant. If the person crosses these colored markings, the situation is detected by the image processing system, in response to which a warning signal can be triggered, for example, and/or the plant can be completely shut down.

The optical detection systems according to the present application can be used for monitoring the stream of bottles in at least individual sections of a bottling plant and/or for the monitoring of the level of occupation of buffer tables and/or for the identification of individual bottles in the stream of bottles, although the present application is not intended to be restricted to these special uses.

For example, the present application also teaches that the optical detection systems can be used to verify whether the plant meets requirements or desired standards regarding cleanliness. The imaging processing system could, for example, detect dirt or spills on the floor of the plant building.

The present application described above can also monitor the filling level reached inside the containers, which can be controlled by modulating the filling valves.

Figure 2:
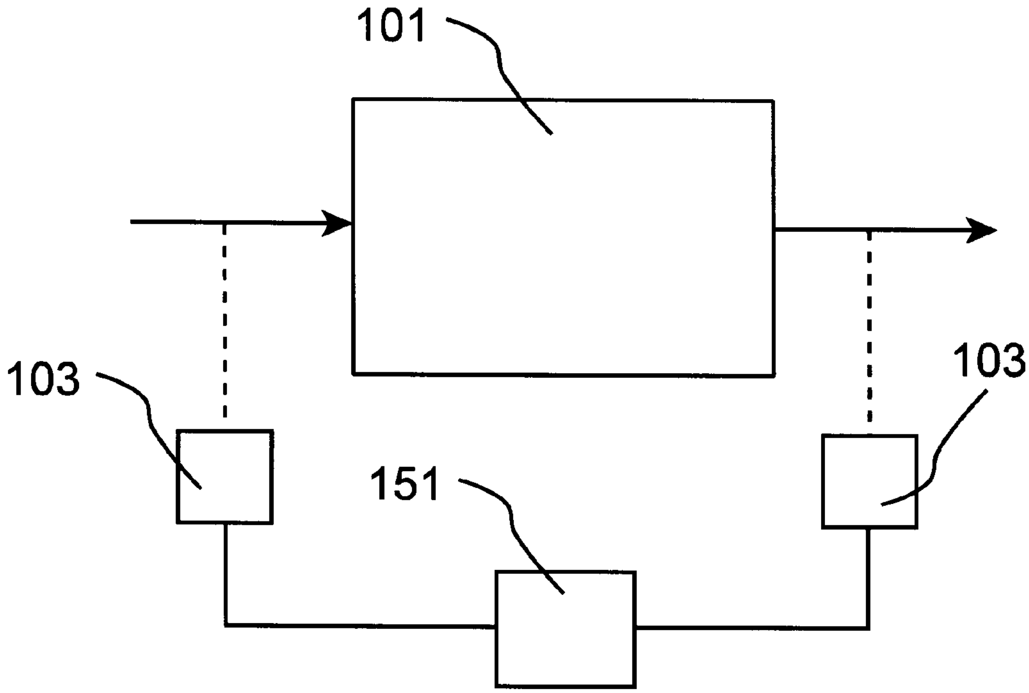
FIG. 2 is a block diagram of a bottle or container treatment arrangement.

FIG. 2 is a block diagram of a bottle or container treatment arrangement. The container treatment arrangement comprises a pasteurizing device or station or arrangement 101 through which bottles or similar containers are conducted. As the bottles are moved through the pasteurizing arrangement 101, the bottles, and thus the product inside the bottles, are heat-treated to a desired pasteurization temperature, and then subsequently cooled as they exit the pasteurizing arrangement 101. Thermal imaging cameras 103 may be positioned optionally at the entry and exit areas of the pasteurizing arrangement 101 in order to monitor the temperature of the bottles or containers entering and exiting the pasteurizing arrangement 101. The temperature data can then be sent to a control system 151, such as a computer control system, and monitored and analyzed. If, for example, the temperature of the bottles or containers is determined to be outside of an acceptable or desired temperature or range of temperatures, an alarm, warning, or alert could be generated by the control system 151 to alert a human operator that there is apparently some sort of malfunction in the operation of the pasteurizing arrangement 101. At least one other possible embodiment, the control system 151 could be operatively connected to the pasteurizing arrangement 101 to permit the control system 151 to automatically modify the operating conditions or parameters of the pasteurizing arrangement 101 upon detection of bottles or containers having a temperature outside of an acceptable or desired temperature or range of temperatures.

Figure 3:
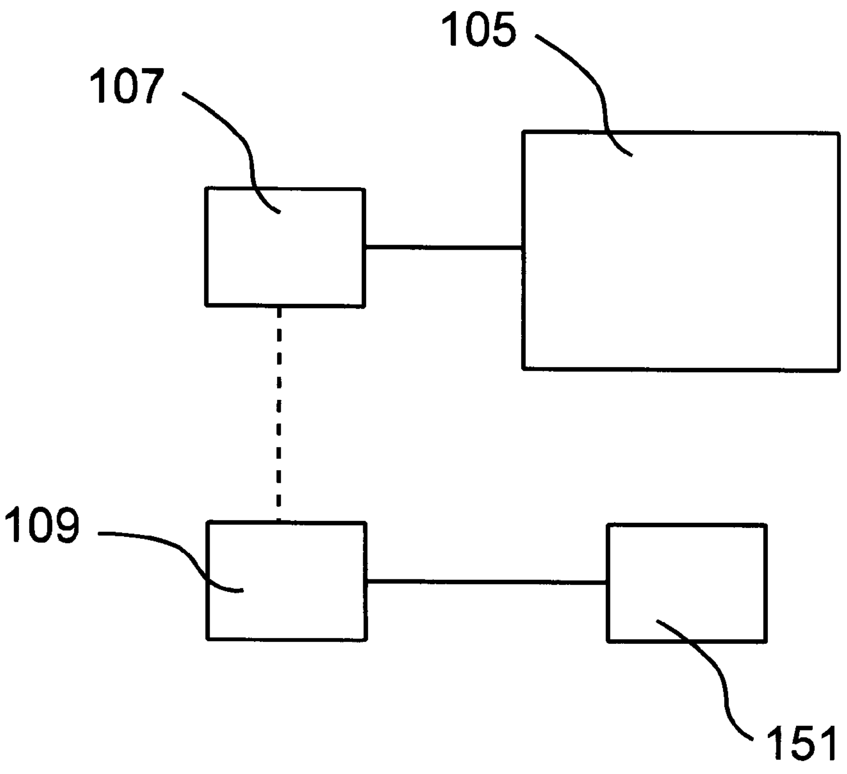
FIG. 3 is a block diagram of a bottle or container labeling arrangement.

FIG. 3 is a block diagram of a bottle or container labeling arrangement. A bottle or container labeling arrangement comprises a labeling machine or device 105 which is fed labels or label material from a supply 107. The supply 107 is monitored by a camera or imaging device 109, which is connected to the control system 151. The camera 109 can be utilized to monitor the amount of label material in the supply 107 in order to keep track of how much label material is available to the labeling machine 105. For example, as a labeling machine 105 operates in a labeling process, the supply 107 of label material will be steadily depleted until it is eventually completely exhausted. Once the supply 107 is exhausted, the labeling machine 105 will not be able to label any further oils or containers. It is therefore necessary to provide additional label material to the supply 107 before it is exhausted. The imaging device 109 sends information regarding the amount of label material in the supply 107 to the control system 151. Upon the imaging device 109 detecting that only a certain amount of label material is left in the supply 107, such as, for example, less than 10% or 5% of the original total amount of label material, the control system 151 could generate an alert or alarm instructing a human operator to provide additional label material to the supply 107. In this manner, shutdowns or interruptions in the operation of the labeling arrangement due to an exhaustion of the supply 107 of label material could essentially be avoided or minimized as the operator would be notified in advance of the exhaustion of the supply 107 to provide additional label material to the supply 107.

Figure 4:
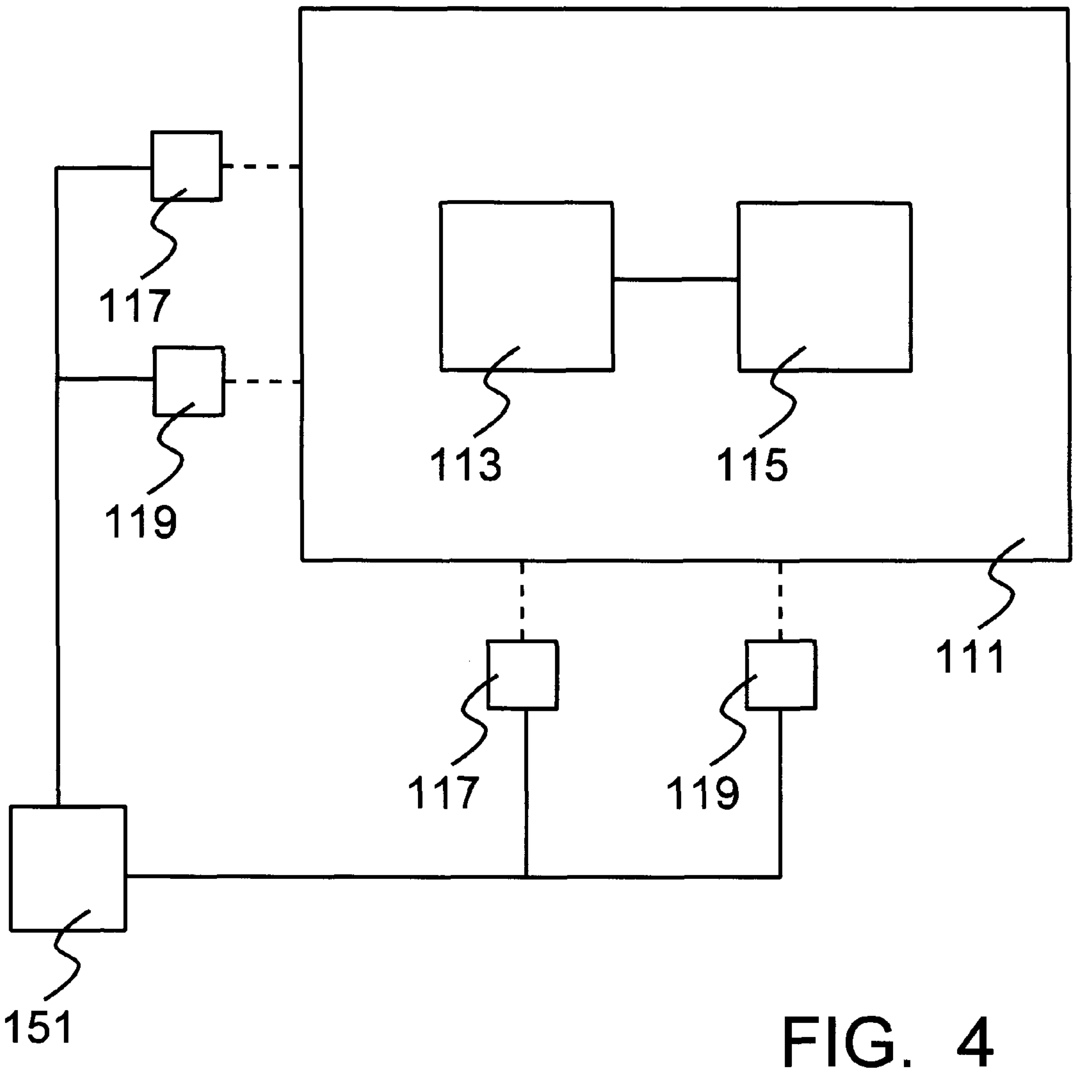
FIG. 4 is a block diagram of a clean room for an aseptic bottle or container handling arrangement.

FIG. 4 is a block diagram of a clean room for an aseptic bottle or container handling arrangement. The clean room 111 may either be a sealed, walled room, or simply an area with a high or substantially high level of cleanliness. Inside the clean room or clean room area 111 are located bottle or container handling machines. In the embodiment shown in FIG. 4, a bottle or container filling machine 113 and closing machine 115 are shown, although other bottle or container handling devices or machines, such as bottle cleaning machines or labeling machines, could be located in the clean room area 111. In the embodiment shown, opto-electronic imaging devices or cameras 117, as well as thermal imaging devices or cameras 119, are used to monitor the clean room area 111. The data gathered by these imaging devices 117, 119 is sent to the control system 151 for storage and analysis. At least one possible embodiment, the imaging devices 117, 119 could be utilized to detect entry of unauthorized personnel into the clean room area 111. For example, if a worker were to accidentally enter the clean room area 111, and thereby jeopardize the level of cleanliness in the clean room area 111, he or she would be detected by the imaging devices 117, 119. An alarm or alert could be generated by the control system 151 to alert the worker and/or a plant manager or supervisor that the worker is in a restricted area. In this manner, accidental contamination of a clean room area 111 could be minimized by quick or substantially quick detection of a person in the clean room area 111. Specifically, the opto-electronic imaging devices or cameras 117 could be utilized to obtain an image or photographic image, which could then be compared against a stored image, such as an image of a person, in the control system 151, in order to permit determination of whether or not an unauthorized person is in the clean room area 111. On the other hand, the thermal imaging devices or cameras 119 could be utilized to obtain a thermal image, which could then be compared against a stored thermal image, such as a thermal image of a person, in the control system 151, in order to permit determination of whether or not an unauthorized person is in the clean room area 111. In at least one possible embodiment, the imaging devices 117, 119 and the control system 151 could be utilized to detect other things besides humans, such as animals and vermin, or possibly accumulations of dirt and debris generated by the operation of the handling machines or breakage of a bottle or container.

Figure 5:
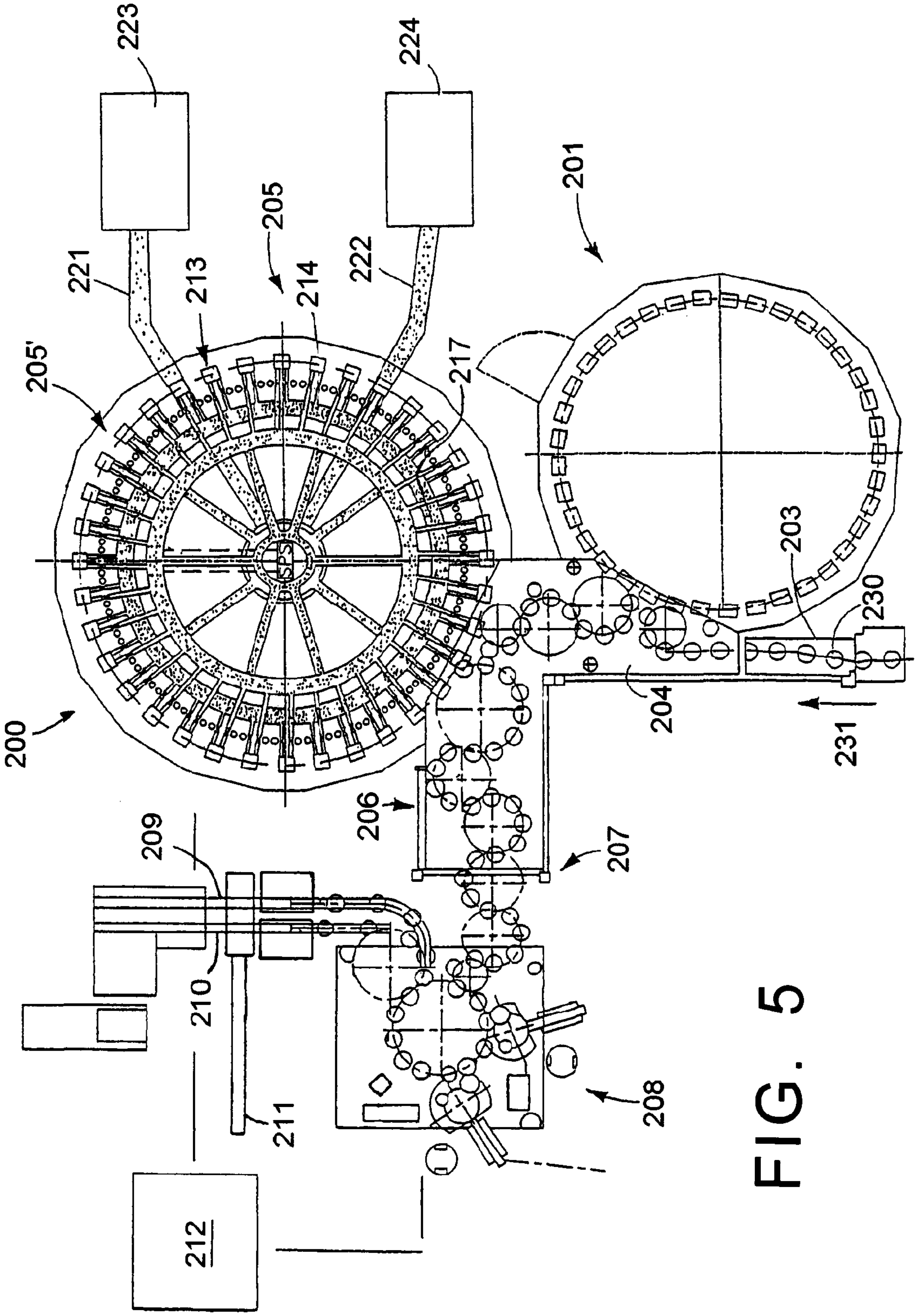
FIG. 5 shows schematically the main components of one possible embodiment example of a system for filling containers.

FIG. 5 shows schematically the main components of one possible embodiment example of a system for filling containers, specifically, a beverage bottling plant for filling bottles 230 with at least one liquid beverage, in accordance with at least one possible embodiment, in which system or plant could possibly be utilized at least one aspect, or several aspects, of the embodiments disclosed herein.

FIG. 5 shows a rinsing arrangement or rinsing station 201, to which the containers, namely bottles 230, are fed in the direction of travel as indicated by the arrow 231, by a first conveyer arrangement 203, which can be a linear conveyor or a combination of a linear conveyor and a starwheel. Downstream of the rinsing arrangement or rinsing station 201, in the direction of travel as indicated by the arrow 231, the rinsed bottles 230 are transported to a beverage filling machine 205 by a second conveyer arrangement 204 that is formed, for example, by one or more starwheels that introduce bottles 230 into the beverage filling machine 205.

The beverage filling machine 205 shown is of a revolving or rotary design, with a rotor 205', which revolves around a central, vertical machine axis. The rotor 205' is designed to receive and hold the bottles 230 for filling at a plurality of filling positions 213 located about the periphery of the rotor 205'. At each of the filling positions 203 is located a filling arrangement 214 having at least one filling device, element, apparatus, or valve. The filling arrangements 214 are designed to introduce a predetermined volume or amount of liquid beverage into the interior of the bottles 230 to a predetermined or desired level.

The filling arrangements 214 receive the liquid beverage material from a toroidal or annular vessel 217, in which a supply of liquid beverage material is stored under pressure by a gas. The toroidal vessel 217 is a component, for example, of the revolving rotor 205'. The toroidal vessel 217 can be connected by means of a rotary coupling or a coupling that permits rotation. The toroidal vessel 217 is also connected to at least one external reservoir or supply of liquid beverage material by a conduit or supply line. In the embodiment shown in FIG. 5, there are two external supply reservoirs 223 and 224, each of which is configured to store either the same liquid beverage product or different products. These reservoirs 223, 224 are connected to the toroidal or annular vessel 217 by corresponding supply lines, conduits, or arrangements 221 and 222. The external supply reservoirs 223, 224 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 214 could be connected by separate connections to each of the two toroidal vessels and have two individually-controllable fluid or control valves, so that in each bottle 230, the first product or the second product can be filled by means of an appropriate control of the filling product or fluid valves.

Downstream of the beverage filling machine 205, in the direction of travel of the bottles 230, there can be a beverage bottle closing arrangement or closing station 206 which closes or caps the bottles 230. The beverage bottle closing arrangement or closing station 206 can be connected by a third conveyer arrangement 207 to a beverage bottle labeling arrangement or labeling station 208. The third conveyor arrangement may be formed, for example, by a plurality of starwheels, or may also include a linear conveyor device.

In the illustrated embodiment, the beverage bottle labeling arrangement or labeling station 208 has at least one labeling unit, device, or module, for applying labels to bottles 230. In the embodiment shown, the labeling arrangement 208 is connected by a starwheel conveyer structure to three output conveyer arrangements: a first output conveyer arrangement 209, a second output conveyer arrangement 210, and a third output conveyer arrangement 211, all of which convey filled, closed, and labeled bottles 230 to different locations.

The first output conveyer arrangement 209, in the embodiment shown, is designed to convey bottles 230 that are filled with a first type of liquid beverage supplied by, for example, the supply reservoir 223. The second output conveyer arrangement 210, in the embodiment shown, is designed to convey bottles 230 that are filled with a second type of liquid beverage supplied by, for example, the supply reservoir 224. The third output conveyer arrangement 211, in the embodiment shown, is designed to convey incorrectly labeled bottles 230. To further explain, the labeling arrangement 208 can comprise at least one beverage bottle inspection or monitoring device that inspects or monitors the location of labels on the bottles 230 to determine if the labels have been correctly placed or aligned on the bottles 230. The third output conveyer arrangement 211 removes any bottles 230 which have been incorrectly labeled as determined by the inspecting device.

The beverage bottling plant can be controlled by a central control arrangement 212, which could be, for example, computerized control system that monitors and controls the operation of the various stations and mechanisms of the beverage bottling plant.

The present application relates to a method for the monitoring, control and optimization of filling plants for products of different types, in one possible embodiment for use in the beverage industry, whereby for the acquisition of information necessary and/or desired for the control or monitoring of the plant, opto-electronic detection systems and data processing equipment associated with these systems are used, whereby image recording units and image processing computers are used.

One feature or aspect of an embodiment is believed at the time of the filing of this patent application to possibly reside broadly in a method for the monitoring, control and optimization of filling plants for products of different types, in one possible embodiment for use in the beverage industry, whereby for the acquisition of information necessary and/or desired for the control or monitoring of the plant, opto-electronic detection systems and data processing equipment associated with these systems are used, wherein image recording equipment and image processing computers are used.

Another feature or aspect of an embodiment is believed at the time of the filing of this patent application to possibly reside broadly in the method, wherein thermal imaging cameras and associated data processing equipment are used.

Yet another feature or aspect of an embodiment is believed at the time of the filing of this patent application to possibly reside broadly in the method, wherein methods for image analysis and/or object recognition are used in the associated data processing equipment.

Still another feature or aspect of an embodiment is believed at the time of the filing of this patent application to possibly reside broadly in the method, wherein the optical recognition systems are used for the detection and recognition of objects.

A further feature or aspect of an embodiment is believed at the time of the filing of this patent application to possibly reside broadly in the method, wherein the objects are containers and/or persons.

Another feature or aspect of an embodiment is believed at the time of the filing of this patent application to possibly reside broadly in the method, wherein the objects are individual containers and/or individual persons.

Yet another feature or aspect of an embodiment is believed at the time of the filing of this patent application to possibly reside broadly in the method, wherein the optical recognition systems are used to recognize the position and/or the orientation and/or movements of objects.

Still another feature or aspect of an embodiment is believed at the time of the filing of this patent application to possibly reside broadly in the method, wherein the optical recognition systems are used for monitoring the stream of containers in at least individual sections of a bottling or filling plant.

A further feature or aspect of an embodiment is believed at the time of the filing of this patent application to possibly reside broadly in the method, wherein the optical recognition systems are used for monitoring the level of occupation of buffer tables.

Another feature or aspect of an embodiment is believed at the time of the filing of this patent application to possibly reside broadly in the method, wherein the optical recognition systems are used for the monitoring of the behavior of individual items of equipment that may have an effect on the upstream/downstream buffers and parts of the plant.

Yet another feature or aspect of an embodiment is believed at the time of the filing of this patent application to possibly reside broadly in the method, wherein the optical recognition systems are used for the measurement of the temperatures of containers and/or part of the plant.

Still another feature or aspect of an embodiment is believed at the time of the filing of this patent application to possibly reside broadly in the method, wherein the optical recognition systems are used for the recording and/or monitoring and/or optimization of the path of movement of persons.

A further feature or aspect of an embodiment is believed at the time of the filing of this patent application to possibly reside broadly in the method, wherein the optical recognition systems are used for the monitoring of the bodily position and/or the movements of persons.

Another feature or aspect of an embodiment is believed at the time of the filing of this patent application to possibly reside broadly in the method, wherein the optical recognition systems are used for the protection of persons, e.g. instead of light barriers.

Yet another feature or aspect of an embodiment is believed at the time of the filing of this patent application to possibly reside broadly in the method, wherein the optical recognition systems are used for the measurement of intralogistics next to the production and transport lines.

Still another feature or aspect of an embodiment is believed at the time of the filing of this patent application to possibly reside broadly in the method, wherein the optical recognition systems are used for the detection and monitoring of the presence of supplies and materials.

A further feature or aspect of an embodiment is believed at the time of the filing of this patent application to possibly reside broadly in the method, wherein the optical recognition systems are used for the monitoring of the plant environment, such as the cleanliness of the floor.

Another feature or aspect of an embodiment is believed at the time of the filing of this patent application to possibly reside broadly in the method, wherein the optical recognition systems are used for control of the valves.

Yet another feature or aspect of an embodiment is believed at the time of the filing of this patent application to possibly reside broadly in the method, wherein the optical recognition systems are used for the monitoring of safety zones and/or closed areas and/or of the clean or sterile rooms.

Still another feature or aspect of an embodiment is believed at the time of the filing of this patent application to possibly reside broadly in a method of monitoring a beverage bottle buffer area in an aseptic beverage bottling plant in order to automatically detect problems or errors in the operation of said buffer area to minimize interruptions in the operation of said beverage bottling plant, said method comprising the steps of: moving beverage bottles into said buffer area; temporarily collecting and storing beverage bottles in said buffer area; moving beverage bottles from said buffer area into a beverage bottle handling machine comprising one of: a cleaning machine, a filling machine, a closing machine, and a packaging machine; monitoring said buffer area with a plurality of opto-electronic imaging devices being operatively connected to a computer control system; obtaining optical image data of said buffer area with said opto-electronic imaging devices and transmitting the optical image data to said computer control system; analyzing the optical image data with image recognition software in said computer control system and determining: a percentage of said buffer area occupied by beverage bottles at the time the optical image data was obtained; orientation of individual beverage bottles in said buffer area; and entry of plant personnel into a restricted area disposed about said buffer area; upon determination of a percentage of said buffer area occupied by beverage bottles at the time the optical image data was obtained exceeding an acceptable predetermined percentage, generating an alert or an alarm and adjusting the operation of said beverage bottling plant to reduce the percentage of said buffer area occupied by beverage bottles below the acceptable predetermined percentage to minimize jamming of said buffer area with an excessive amount of beverage bottles, and thereby minimizing interruptions in the operation of said beverage bottling plant; upon determination of orientation of at least one individual beverage bottle in said buffer area being different from an acceptable predetermined orientation, generating an alert or an alarm and removing the at least one individual, disoriented beverage bottle from said buffer area to minimize jamming of disoriented beverage bottles in said buffer area or in said beverage bottle handling machine, and thereby minimizing interruptions in the operation of said beverage bottling plant; and upon detection of entry of plant personnel into the restricted area disposed about said buffer area, generating an alert or an alarm and instructing the plant personnel to exit the restricted area.

A further feature or aspect of an embodiment is believed at the time of the filing of this patent application to possibly reside broadly in a method of monitoring a container buffer area in a container filling plant, such as in the beverage industry, in order to automatically detect problems or errors in the operation of said buffer area to minimize interruptions in the operation of said container filling plant, said method comprising the steps of: moving containers into said buffer area; temporarily collecting and storing containers in said buffer area; moving containers from said buffer area into a container handling machine, such as a cleaning machine, a filling machine, a closing machine, and a packaging machine; monitoring said buffer area with an imaging arrangement being operatively connected to a computer control system; obtaining image data of said buffer area with said imaging devices and transmitting the image data to said computer control system; analyzing the image data with image recognition software in said computer control system and determining: a portion of said buffer area occupied by beverage bottles at the time the optical image data was obtained; and orientation of individual beverage bottles in said buffer area; upon determination of a portion of said buffer area occupied by beverage bottles at the time the image data was obtained exceeding an acceptable predetermined portion, generating an alert or an alarm and adjusting the operation of said beverage bottling plant to reduce the portion of said buffer area occupied by beverage bottles below the acceptable predetermined portion to minimize jamming of said buffer area with an excessive amount of beverage bottles, and thereby minimizing interruptions in the operation of said beverage bottling plant; and upon determination of orientation of at least one individual beverage bottle in said buffer area being different from an acceptable predetermined orientation, generating an alert or an alarm and removing the at least one individual, disoriented beverage bottle from said buffer area to minimize jamming of disoriented beverage bottles in said buffer area or in said beverage bottle handling machine, and thereby minimizing interruptions in the operation of said beverage bottling plant.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of thermal imaging cameras which may possibly be used in at least one possible embodiment of the present application may possibly be found in the following U.S. patents: U.S. Pat. No. 7,122,788, entitled "Adaptively reducing offset in a thermal imaging camera;" U.S. Pat. No. 6,649,912, entitled "Thermal imaging camera;" U.S. Pat. No. 6,486,473, entitled "Thermal imaging camera;" U.S. Pat. No. 5,994,699, entitled "Thermal camera for infrared imaging;" U.S. Pat. No. 5,949,582, entitled "Thermal imaging camera;" U.S. Pat. No. 4,551,760, entitled "Television camera with solid-state imagers cooled by a thermal servo;" U.S. Pat. No. 4,322,620, entitled "Camera tube for thermal imaging;" U.S. Pat. No. 4,190,769, entitled "Thermal image camera with storage;" and U.S. Pat. No. 4,031,393, entitled "Thermal image camera."

Some examples of opto-electronic sensors, systems, or devices which may possibly be used in at least one possible embodiment of the present application may possibly be found in the following U.S. patents: U.S. Pat. No. 6,907,390, entitled "Miniaturized opto-electronic magnifying system;" U.S. Pat. No. 6,849,843, entitled "Focal surface and detector for opto-electronic imaging systems, manufacturing method and opto-electronic imaging system;" U.S. Pat. No. 6,488,417, entitled "Opto-electronic assembly having an integrated imaging system;" U.S. Pat. No. 6,328,214, entitled "Opto-electronic device for acquisition of images of codes in one and two dimensions;" U.S. Pat. No. 6,081,388, entitled "Opto-electronic imaging system for industrial applications;" U.S. Pat. No. 5,965,880, entitled "Tactile opto-electronic pressure sensor;" U.S. Pat. No. 4,866,262, entitled "Optical imaging arrangement comprising an opto-electronic focussing-error detection system;" U.S. Pat. No. 4,712,205, entitled "Opto-electronic focussing-error detection system with a compound wedge beam splitter;" U.S. Pat. No. 4,356,392, entitled "Optical imaging system provided with an opto-electronic detection system for determining a deviation between the image plane of the imaging system and a second plane on which an image is to be formed;" and U.S. Pat. No. 3,992,574, entitled "Opto-electronic system for determining a deviation between the actual position of a radiation-reflecting plane in an optical imaging system and the desired position of said plane."

Some examples of opto-electronic sensors, systems, or devices for detecting and/or analyzing images which may possibly be used in at least one possible embodiment of the present application may possibly be found in the following U.S. patents: U.S. Pat. No. 7,449,903, entitled "Method and system for the optical inspection of contact faces at semiconductor devices with different appearances;" U.S. Pat. No. 7,400,768, entitled "Enhanced optical recognition of digitized images through selective bit insertion;" U.S. Pat. No. 7,100,345, entitled "Device for positioning a web of film of a packaging device;" U.S. Pat. No. 7,097,029, entitled "Parcel goods aligning device;" U.S. Pat. No. 7,017,623, entitled "Automated use of a vision system to unroll a label to capture and process drug identifying indicia present on the label;" U.S. Pat. No. 6,820,399, entitled "Method and device for positioning a web of film of a packaging device;" and U.S. Pat. No. 5,754,693, entitled "Method of optical recognition and classification of patterns."

Some examples of image recognition software which may possibly be used in at least one possible embodiment of the present application may possibly be found in the following U.S. patents: U.S. Pat. No. 6,931,596, entitled "Automatic positioning of display depending upon the viewer's location;" U.S. Pat. No. 6,771,819, entitled "System and method for dynamic image recognition;" U.S. Pat. No. 6,738,723, entitled "Pharmacy pill counting vision system;" U.S. Pat. No. 6,687,397, entitled "System and method for dynamic image recognition;" U.S. Pat. No. 6,650,770, entitled "System and method for creating a knowledge base;" U.S. Pat. No. 6,577,757, entitled "System and method for dynamic image recognition;" U.S. Pat. No. 6,574,580, entitled "Pharmacy pill counting vision system;" and U.S. Pat. No. 6,175,638, entitled "Shadow image acquisition device."

Some examples of cameras for monitoring a packaging station in a bottling or container handling plant which may possibly be used in at least one possible embodiment of the present application may possibly be found in U.S. patent application Ser. No. 12/555,562, filed Sep. 8, 2009, and having first named inventor Schilling, which application is incorporated by reference herein.

An example of an aseptic bottling plant having portions housed in a clean room which may possibly be used in at least one possible embodiment of the present application may possibly be found in U.S. patent application Ser. No. 12/362,633, filed Jan. 30, 2009, and having first named inventor Sangi, which application is incorporated by reference herein.

Some examples of buffers or buffer tables for bottling and container handling arrangements which may possibly be used in at least one possible embodiment of the present application may possibly be found in the following U.S. patents: U.S. Pat. No. 7,571,585, entitled "Beverage bottling or container filling plant having a beverage bottle or container handling machine and a method of operation thereof;" U.S. Pat. No. 6,058,985, entitled "Bottling machine with a set-up table and a set-up table for a bottling machine and a set-up table for a bottle handling machine;" U.S. Pat. No. 5,996,322, entitled "In-line bottling plant;" and U.S. Pat. No. 5,896,899, entitled "Method and an apparatus for sterile bottling of beverages." Another example of a buffer or buffer table is found in German patent publication DE 20210447, filed Jul. 5, 2002, and having applicant KHS Maschinen-und Anlagenbau AG.

Some examples of pasteurizing stations or arrangements for use in bottling and container handling arrangements which may possibly be used in at least one possible embodiment of the present application may possibly be found in the following U.S. patents: U.S. Pat. No. 7,513,092, entitled "Beverage bottling plant for filling bottles with a liquid beverage filling material, and a method for the operation thereof;" and U.S. Pat. No. 6,834,473, entitled "Bottling plant and method of operating a bottling plant and a bottling plant with sections for stabilizing the bottled product."

Some examples of bottling and container handling systems and components thereof which may possibly be utilized or adapted for use in at least one possible embodiment, may possibly be found in the following U.S. patents: U.S. Pat. No. 6,484,477, entitled "Capping Machine for Capping and Closing Containers, and a Method for Closing Containers;" U.S. Pat. No. 6,474,368, entitled "Beverage Container Filling Machine, and Method for Filling Containers with a Liquid Filling Material in a Beverage Container Filling Machine;" U.S. Pat. No. 6,494,238, entitled "A Plant for Filling Beverage into Beverage Bottles Other Beverage Containers Having Apparatus for Replacing Remaining Air Volume in Filled Beverage Bottles or Other Beverage Containers;" U.S. Pat. No. 6,470,922, entitled "Apparatus for the Recovery of an Inert Gas;" U.S. Pat. No. 6,463,964, entitled "Method of Operating a Plant for Filling Bottles, Cans or the like Beverage Containers with a Beverage, and a Beverage Container Filling Machine;" U.S. Pat. No. 6,834,473, entitled "Bottling Plant and Method of Operating a Bottling Plant and a Bottling Plant with Sections for Stabilizing the Bottled Product;" U.S. Pat. No. 6,484,762, entitled "A Filling System with Post-dripping Prevention;" U.S. Pat. No. 6,668,877, entitled "Filling System for Still Beverages;" U.S. Pat. No. 7,024,841, entitled "Labeling Machine with a Sleeve Mechanism for Preparing and Applying Cylindrical Labels onto Beverage Bottles and Other Beverage Containers in a Beverage Container Filling Plant;" U.S. Pat. No.

6,971,219 entitled “Beverage bottling plant for filling bottles with a liquid beverage filling material and a labelling station for labelling filled bottles and other containers;” U.S. Pat. No. 6,973,767, entitled “Beverage bottling plant and a conveyor arrangement for transporting packages;” U.S. Pat. No. 7,013,624, entitled “Beverage bottling plant for filling bottles with a liquid beverage filling material, a container filling plant container information adding station, such as, a labeling station, configured to add information to containers, such as, bottles and cans, and modules for labeling stations;” U.S. Pat. No. 7,108,025, entitled “Beverage Bottling Plant for Filling Bottles with a Liquid Beverage Filling Material, and a Container Filling Lifting Device for Pressing Containers to Container Filling Machines;” U.S. Pat. No. 7,062,894, entitled “Beverage Bottling Plant for Filling Bottles with a Liquid Beverage Filling Material, and a Container Filling Plant Container Information Adding Station, Such As, a Labeling Station Having a Sleeve Label Cutting Arrangement, Configured to Add Information to Containers, Such As, Bottles and Cans;” U.S. Pat. No. 7,010,900, entitled “Beverage Bottling Plant for Filling Bottles with a Liquid Beverage Filling Material, and a Cleaning Device for Cleaning Bottles in a Beverage Bottling Plant;” U.S. Pat. No. 6,918,417, entitled “A Beverage Bottling Plant for Filling Bottles with a Liquid Beverage Filling Material, and an Easily Cleaned Lifting Device in a Beverage Bottling Plant;” U.S. Pat. No. 7,065,938, entitled “A Beverage Bottling Plant for Filling Bottles with a Liquid Beverage Filling Material, and a Container Filling Plant Container Information Adding Station, Such As, a Labeling Station Having a Gripper Arrangement, Configured to Add Information to Containers, Such As, Bottles and Cans;” U.S. Pat. No. 6,901,720, entitled “A Beverage Bottling Plant for Filling Bottles with a Liquid Beverage Filling Material, and Apparatus for Attaching Carrying Grips to Containers with Filled Bottles;” and U.S. Pat. No. 7,121,062 “Beverage bottling plant for filling bottles with a liquid beverage filling material, having a container handling machine with interchangeable receptacles for the container mouth.”

An example of a camera system for inspecting bottles which may possibly be used in at least one possible embodiment of the present application may possibly be found in U.S. Patent Publication US 20060283145, filed Apr. 17, 2006, and having applicants Weisgerber et al., which publication is incorporated by reference herein.

An example of an aseptic bottling system and components thereof which may possibly be used in at least one possible embodiment of the present application may possibly be found in U.S. Patent Publication US 20050188651, filed Feb. 3, 2005, and having applicant Clüsserath, which publication is incorporated by reference herein.

The following patents, patent applications or patent publications, are hereby incorporated by reference as if set forth in their entirety herein: DE 10 2004 029 359 B4, having the following English translation of the German title “DEVICE FOR PLACING AN OBJECT,” published on Jan. 19, 2006.

All of the patents, patent applications or patent publications, which were cited in the German Office Action dated Jul. 15, 2008, and/or cited elsewhere are hereby incorporated by reference as if set forth in their entirety herein as follows: DE 10 2004 029 356, having the following English translation of the German title “Plant’s e.g. energy distribution plant, condition monitoring system for e.g. automation engineering, has image recording unit for recording image of plant that has visualisation unit made of chromogenic material to indicate condition,” published on Feb. 2, 2006; DE 41 14 798, having the following English translation of the German title “Apparatus for sterilising packaging contaners, subjected to high temperatures,” published on Nov. 12, 1992; DE 43 32 645, having the following English translation of the German title “Drinks-pouring machine,” published on Mar. 30, 1995; DE 42 07 835, having the following English translation of the German title “Arrangement for sorting containers, esp. bottles, —contains braking section for separating bottles upstream of inspection station,” published on Sep. 16, 1993; EP 0 982 696, having the following English translation of the German title “Device for automatic, intelligent surveillance of geographic spaces, areas and objects like borderlines of every sort,” published on Mar. 1, 2000; DE 198 56 067, having the following English translation of the German title “Apparatus for positioning small production parts for working, testing or packing purposes has a parts container and intermediate conveyor to place individual parts on a turntable,” published on Jun. 15, 2000; EP 1 026 079, having the following English translation of the German title “Method and device for detecting and removing defective and/or defectively positioned cigarettes,” published on Aug. 9, 2000; DE 201 20 700, having the following German title “Flaschenbehandlungsvorrichtung,” published on Apr. 30, 2003; DE 10 2005 020 020, having the following English translation of the German title “Article e.g. advertising medium, operational sequences monitoring method, involves verifying positioning between digitally detected object/location marking and digitally detected article based on marking and digitally detected article,” published on Nov. 9, 2006; DE 102 45 720, having the following English translation of the German title “Safety method for protecting automatic machine danger area with scene analysis of different images of danger area via 2 different analysis algorithms for reliable detection of foreign object in danger area,” published on Apr. 1, 2004; DE 202 03 287, having the German title “Zwischenablagevorrichtung zum automatischen Umpacken von Artikeln von einer Palette in Behälter,” published on Jun. 20, 2002; DE 100 33 652, having the following German title “Monitoring system for remote controlled inventory, has head office with evaluation unit that processes signal sequence of data from receiver to obtain actual state of inventory,” published on Jan. 24, 2002; DE 43 43 750, having the following English translation of the German title “Drink filler with froth control,” published on Sep. 1, 1994.

All of the patents, patent applications or patent publications, which were cited in the International Search Report dated Jan. 29, 2009, and/or cited elsewhere are hereby incorporated by reference as if set forth in their entirety herein as follows: EP 0 512 244, having the following English translation of the German title “Apparatus for sterilising packaging contaners, subjected to high temperatures,” published on Nov. 11, 1992.

The patents, patent applications, and patent publication listed above in the preceding fourteen paragraphs are herein incorporated by reference as if set forth in their entirety. The purpose of incorporating U.S. patents, foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2007 014 802.1, filed on Mar. 28, 2007, having inventors Volker TILL, Olaf MUSZINSKI, Rolf FÜSSMANN, Thomas STIENEN, Ulrich SCHOLZ, and Herbert MENKE, and DE-OS 10 2007 014 802.1 and DE-PS 10 2007 014 802.1, and International Application No. PCT/EP2008/001775, filed on Mar. 6, 2008, having WIPO Publication No. WO 2008/116546 and inventors Volker TILL, Olaf MUSZINSKI, Rolf FÜSSMANN, Thomas STIENEN, Ulrich SCHOLZ, and Herbert MENKE, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the corresponding foreign equivalent patent application(s), that is, PCT/EP2008/001775 and German Patent Application 10 2007 014 802.1, is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2008/001775 and DE 10 2007 014 802.1 from which this patent application claims priority which do not have to do with the correction of the translation in this patent application are not to be included in this patent application in the incorporation by reference.

Any statements about admissions of prior art in the original foreign patent applications PCT/EP2008/001775 and DE 10 2007 014 802.1 are not to be included in this patent application in the incorporation by reference, since the laws relating to prior art in non-U.S. Patent Offices and courts may be substantially different from the Patent Laws of the United States.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of monitoring, controlling, and optimizing operation of a container filling plant, said method comprising:

obtaining image data of different areas of said container filling plant using an electronic, image-detection arrangement;

transferring said image data to a processing computer;

analyzing said image data to determine if a plant worker, a machine, or a container is in an unwanted condition sufficient to cause at least one of: disruption in the operation of the plant, injury to a plant worker, or damage to a machine; and generating a signal for either automatic correction or manual correction of said unwanted condition based on said image data.

2. The method according to claim 1, wherein said step of monitoring comprises using optical image cameras of said electronic, image-detection arrangement.

3. The method according to claim 2, wherein said step of monitoring comprises visually monitoring at least one of plant workers and containers, wherein said containers or said plant workers are monitored individually or in groups, and said step of analyzing comprises detecting and recognizing at least one of the orientation, position, and movement of at least one of said containers and said plant workers.

4. The method according to claim 3, wherein said step of monitoring comprises monitoring, using thermal image cameras, the temperature of containers and said machine components of said container filling plant.

5. The method according to claim 4, wherein said step of monitoring the temperature of containers comprises detecting the temperature of containers as the containers enter and/or exit a pasteurizing machine configured to pasteurize a food or beverage in the containers, and said step of analyzing comprises determining if the detected temperatures are within a predetermined range.

6. The method according to claim 1, wherein:

said step of monitoring comprises visually monitoring a buffer area configured to temporarily collect and store containers; and said step of analyzing comprises determining, based on image data of said buffer area, a percentage of said buffer area which is occupied by containers.

7. The method according to claim 6, wherein:

said step of determining the occupation percentage of said buffer area comprises detecting the number of containers in said buffer area, and then comparing the detected number with a maximum possible number of containers which can be stored in said buffer area; and said step of analyzing comprises analyzing said image data of said buffer area and determining if an unwanted plant condition is present which could lead to jamming of said buffer area and interruptions in operation of said container filling plant, which unwanted plant condition comprises one of: an excessive portion of said buffer area being occupied by containers, and at least one individual container being in a different orientation than an acceptable predetermined orientation.

8. The method according to claim 1, wherein said step of monitoring comprises visually monitoring, using optical image cameras of said electronic, image-detection arrangement, at least one of: the movement and the location of plant workers in said areas of said container filling plant.

9. The method according to claim 8, wherein said step of analyzing comprises determining if a plant worker is located in an area which is off limits to plant workers, or an aseptic container handling area, or a sterile container handling area.

10. The method according to claim 8, wherein said step of analyzing comprises determining if a plant worker is in an emergency situation by determining if the plant worker is in either a position different from a predetermined acceptable position or set of acceptable positions, or in a single position for a period of time greater than a predetermined period of time.

11. The method according to claim 8, wherein said step of monitoring comprises visually monitoring movements of plant workers in said container filling plant, and said method further comprises storing the movements of plant workers in said container filling plant for use in determining design of future container filling plants to be constructed.

12. The method according to claim 1, wherein said step of monitoring comprises monitoring both plant workers and containers, wherein said containers and said plant workers are monitored individually or in groups, and said step of analyzing comprises detecting and recognizing at least one of the orientation, position, and movement of said plant workers and containers.

13. The method according to claim 12, wherein said step of monitoring comprises:

using optical image cameras and thermal image cameras of said electronic image detection arrangement;

monitoring streams of containers in said plurality of areas of said container filling plant for interruptions in movement of containers; and monitoring operation of components of said container filling plant for incorrect operation of said components which may affect operation of machines of said container filling plant disposed upstream or downstream of said components.

14. The method according to claim 13, wherein said step of monitoring comprises:

monitoring temperatures of containers and machine components of said container filling plant;

monitoring an amount of material in a machine of said container filling plant;

monitoring at least one component of said container filling plant for presence of contaminants, including dirt or spilled product; and monitoring an amount of liquid in containers being filled.

15. The method according to claim 1, wherein said method comprises obtaining image data, using optical image cameras of said electronic, image-detection arrangement, from a container cleaning station, a container filling station, a container closing station, a container labeling station, and a container packing station.

16. The method according to claim 15, wherein said method comprises comparing the detected image data of said stations with stored image data to detect for incorrect operation of at least one of said stations which may cause disruption of the operation of said container filling plant.

17. The method according to claim 16, wherein:

said step of monitoring comprises visually monitoring movement of containers at least one of into, through, and out of said stations for conditions sufficient to cause interruption in movement of containers;

said step of monitoring comprises visually monitoring said stations for presence of contaminants, including dirt or spilled product;

said step of analyzing comprises determining if the contaminants are in an amount which exceeds an acceptable predetermined amount;

said step of monitoring comprises visually monitoring an amount of liquid in containers, and said method further comprises controlling filling valves of said container filling station based on the detected amount of liquid in the containers; and said step of monitoring comprises visually monitoring said labeling station to determine if the supply of label material is outside of a predetermined level.

18. The method according to claim 1, wherein:

said step of obtaining image data comprises obtaining image data from container handling stations of said container handling plant; and said step of analyzing said image data comprises comparing the detected image data of said stations with stored image data to detect for incorrect operation of at least one of said stations which may cause incorrect operation of said container filling plant.

19. The method according to claim 18, wherein said container handling stations comprise a container filling station, a container closing station, and a container packing station.

20. The method according to claim 1, wherein said step of monitoring comprises using solely optical image cameras of said electronic, image-detection arrangement.

* * * * *